(12) United States Patent
Didzbalis et al.

(10) Patent No.: US 7,867,540 B2
(45) Date of Patent: Jan. 11, 2011

(54) AROMA COMPOSITION AND METHOD

(75) Inventors: John Didzbalis, Cranford, NJ (US); Fred J. Plog, Damascus, MD (US); Karl A. Ritter, Easton, PA (US); Rainer M. Schmitt, Munich (DE)

(73) Assignee: Mars, Inc., McLean, VA (US)

( * ) Notice: Subject to any disclaimer, the term of this patent is extended or adjusted under 35 U.S.C. 154(b) by 1006 days.

(21) Appl. No.: 11/489,399

(22) Filed: Jul. 19, 2006

(65) Prior Publication Data
US 2007/0071860 A1    Mar. 29, 2007

Related U.S. Application Data

(60) Provisional application No. 60/700,502, filed on Jul. 19, 2005.

(51) Int. Cl.
A23L 2/56 (2006.01)
(52) U.S. Cl. .................. 426/534; 426/536; 426/805
(58) Field of Classification Search ........... 426/534, 426/535, 643, 650
See application file for complete search history.

(56) References Cited

U.S. PATENT DOCUMENTS

| 4,362,748 | A | * | 12/1982 | Cox ..................... 426/1 |
| 4,992,284 | A | * | 2/1991 | Kunz ................. 426/241 |
| 6,074,683 | A | | 6/2000 | Rosing et al. |
| 6,660,319 | B1 | * | 12/2003 | Shi et al. ............... 426/533 |
| 2003/0078186 | A1 | | 4/2003 | Christopher et al. |
| 2004/0028787 | A1 | | 2/2004 | Kawaguchi et al. |
| 2005/0142169 | A1 | * | 6/2005 | Imafidon et al. ........... 424/442 |

FOREIGN PATENT DOCUMENTS

| EP | 0167214 | 1/1986 |
| WO | WO-02/49607 | 6/2002 |
| WO | WO-2005/053421 | 6/2005 |

OTHER PUBLICATIONS

Belitz et al. "Table 5.39 Examples of primary qualities of odors." Food Chemisty. 1999. Springer, Second Edition. p. 373.*
Kerler et al. "Character impact odorants of boiled chicken: changes during refrigerated storage and reheating", in Z Leebensm Unters Forsch A (1997) 205: 232-238.*
Byrne, B. "Chapter 7—Reaction Flavors: The Next Generation" In Process and Reaction Flavors, Weerasinghe, D. et al. , ACS Symposium Series,—American Chemical Society, Washington, D.C. 2005, p. 98-104.*
Chevance et al. "Identification of Major Volatile Odor Compounds in Frankfurters" in J. Agric. Food Chem. 1999, 47, 5151-5160.*
Shimizu et al. JP 2000139397—Abstract only.*
Hofmann et al, "Identification of Potent Aroma Compounds in Thermally Treated Mixtures of Glucose/Cysteine and Rhamnose/Cysteine Using Aroma Extract Dilution Techniques," J. Agric. Food Chem., 1997, 45 (3), pp. 898-906.
Supplemental European Search Report issued Oct. 31, 2008, during the prosecution of European Application No. EP 06 78 7762, mailed Nov. 18, 2008.
European Patent Office Communication Pursuant to Article 94(3) EPC issued Mar. 4, 2009, regarding EP Application No. 06787762.1-2114.
Hofmann et al, "Identification of Potent Aroma Compounds in Thermally Treated Mixtures of Glucose/Cysteine and Rhamnose/Cysteine Using Aroma Extract Dilution Techniques," J. Agric. Food Chem., 1997, 45 (3), pp. 898-906.
Supplementary European Search Report issued Nov. 18, 2008, during the prosecution of European Application No. 06 787 762.1.
Withycombe et al., "Identification of 2-Methyl-3-Furanthiol in the Steam Distillate from Canned Tuna Fish", Journal of Food Science, 1988, vol. 53(2), 658-658.
Communication pursuant to Article 94(3) EPC, issued Dec. 4, 2009, during prosecution of European Application No. 06787762.1.

* cited by examiner

*Primary Examiner*—Keith D Hendricks
*Assistant Examiner*—Elizabeth Gwartney
(74) *Attorney, Agent, or Firm*—Fulbright & Jaworski, L.L.P.

(57) ABSTRACT

An aroma composition comprising a first component selected from the group consisting of 4-hydroxy-2,5-dimethyl-3(2H) furanone, 3-hydroxy-2-methyl-4H-pyran-4-one, 2-ethyl-4-hydroxy-5-methyl-3(2H)furanone, 4-hydroxy-5-methyl-3 (2H)furanone, a sulfur-containing analogue of any of the foregoing, and any combination, thereof; a second component selected from the group consisting of 2-furanmethanethiol, 2-methyl-3-furanthiol, 5-methyl-2-furanmethanthiol, and any combination, thereof; and a third component selected from the group consisting of 2-(1-mercaptoethyl)furan, 2-furanethanethiol, bis-(2-furfuryl) disulfide, a furanthiol disulfide, and any combination, thereof. The aroma composition can further include at least one alkylamine or benzylamine and/or a compound selected from the group consisting of hexenol, 1,5-octadien-3-one, methylthiopropionaldehyde, 2,3-diethyl-5-methylpyrazine, (E)-2-nonenal, (E,Z)-2,6-nonadienal, butanoic acid, 2 and 3-methyl butanoic acid, 2-methyl-3-(methyldithio)furan, dimethyltetrasulfide, 4-hydroxy-2-ethyl-5-methyl-3-(2H)furanone, m-cresol, 3-hydroxy-4,5-dimethyl-2-(5H)furanone, and any combination thereof.

21 Claims, No Drawings

US 7,867,540 B2

AROMA COMPOSITION AND METHOD

CROSS-REFERENCE TO RELATED APPLICATIONS

This application claims priority to U.S. provisional patent application Ser. No. 60/700,502 filed on Jul. 19, 2005.

TECHNICAL FIELD

This invention pertains to an aroma composition and more particularly to a tuna aroma composition.

BACKGROUND OF THE INVENTION

Flavors play a critical role in the appreciation of products, especially food and beverage products. This is also particularly true for animal food products, such as human food, cat food and dog food. Aroma also plays an important role in the appreciation of non-food products.

A number of feeding trials have been shown that canned tuna products consistently feed well in cats, regardless of whether the cats are considered fish or non-fish eaters. Canned tuna products are also recognized by cat owners as being well-liked by cats. Additionally, the aroma of canned tuna is not found to be as offensive as are most canned pet foods in part because canned tuna is also sold as food for humans. Much work has been attempted to improve the palatability and aroma of foods. Most of this work related to protein based foods and pet foods has been directed at general meaty and dairy flavors. However, none of this work has been shown to create an aroma with the likeness to canned tuna, a flavor which is particularly desirable to most cats. The aroma of canned tuna is very complex and differs greatly from that of raw or grilled tuna. There remains a need for an aroma composition that smells like tuna.

The inventors have surprisingly found that combination of just three or four aroma compounds, which on their own do not resemble a tuna aroma, together mimic the smell of canned tuna as tested by human panel.

BRIEF SUMMARY OF THE INVENTION

The present invention is directed to compositions and methods to modify the flavor of a variety of food compositions, non-food articles, and other products.

In one aspect of the present invention, there is an aroma composition comprising a first component selected from the group consisting of 4-hydroxy-2,5-dimethyl-3(2H)furanone, 3-hydroxy-2-methyl-4H-pyran-4-one, 2-ethyl-4-hydroxy-5-methyl-3(2H)furanone, 4-hydroxy-5-methyl-3(2H)furanone, a sulfur-containing analogue of any of the foregoing, and any combination thereof; a second component selected from the group consisting of 2-furanmethanethiol, 2-methyl-3-furanthiol, 5-methyl-2-furanmethanthiol, and any combination thereof; and, a third component selected from the group consisting of 2-(1-mercaptoethyl)furan, 2-furanethanethiol, bis-(2-furfuryl) disulfide, a furanthiol disulfide, and any combination, thereof. Preferably, the first component comprises 4-hydroxy-2,5-dimethyl-3(2H)furanone, the second component comprises 2-furanmethanethiol, and the third component comprises 2-(1-mercaptoethyl)furan. Preferably, the ratio of 2-(1-mercaptoethyl)furan:2-furanmethanethiol:4-hydroxy-2,5-dimethyl-3(2H)furanone is x:y:z where x ranges from about 13 to about 17, y ranges from about 22 to about 26, and z ranges from about 400 to about 600. More preferably, the ratio of 2-(1-mercaptoethyl)furan:2-furanmethanethiol:4-hydroxy-2,5-dimethyl-3(2H)furanone is x:y:z where x is about 15, y is about 24, and z is about 450. In some embodiments, the composition comprises a 1:1 water:oil mixture and the 4-hydroxy-2,5-dimethyl-3(2H)furanone ranges from 40 ppb to 120 ppm, the 2-furanmethanethiol ranges from 1 ppb to 1200 ppb and the 2-(1-mercaptoethyl)furan ranges from 1 ppb to 900 ppb. Preferably, the composition further comprises at least one organic amine. In some embodiments comprising at least one organic amine, the composition comprises a 1:1 water:oil mixture, the organic amine is trimethylamine, and the trimethylamine ranges from about 5 ppb to about 5000 ppb. In some embodiments, wherein the ratio of 2-(1-mercaptoethyl)furan:2-furanmethanethiol:4-hydroxy-2,5-dimethyl-3(2H)furanone:organic amine is x:y:z:a where x ranges from about 13 to about 17, y ranges from about 22 to about 26, z ranges from about 400 to about 600, and "a" ranges from about 50 to about 400. The composition may sometimes further comprise a compound selected from the group consisting of hexenol, 1,5-octadien-3-one, 3-(methylthio)propionaldehyde, 2,3-diethyl-5-methylpyrazine, (E)-2-nonenal, (E,Z)-2,6-nonadienal, butanoic acid, 2 or 3-methyl butanoic acid, 2-methyl-3-(methyldithio)furan, dimethyltetrasulfide, dimethyltrisulfide, 4-hydroxy-2-ethyl-5-methyl-3-(2H)furanone, m-cresol, 3-hydroxy-4,5-dimethyl-2-(5H)furanone, and any combination thereof. In some embodiments, the aroma composition has a tuna flavor.

In another aspect of the present invention, there is a method of flavoring a product comprising the step of admixing the product with an aroma composition wherein the aroma composition comprises a first component selected from the group consisting of 4-hydroxy-2,5-dimethyl-3(2H)furanone, 3-hydroxy-2-methyl-4H-pyran-4-one, 2-ethyl-4-hydroxy-5-methyl-3(2H)furanone, 4-hydroxy-5-methyl-3(2H)furanone, a sulfur-containing analogue of any of the foregoing, and any combination, thereof; a second component selected from the group consisting of 2-furanmethanethiol, 2-methyl-3-furanthiol, 5-methyl-2-furanmethanthiol, and any combination, thereof; and, a third component selected from the group consisting of 2-(1-mercaptoethyl)furan, 2-furanethanethiol, bis-(2-furfuryl)disulfide, a furanthiol disulfide, and any combination, thereof. Preferably, the first component comprises 4-hydroxy-2,5-dimethyl-3(2H)furanone, said second component comprises 2-furanmethanethiol, and said third component comprises 2-(1-mercaptoethyl)furan. Preferably, the aroma composition has a ratio of 2-(1-mercaptoethyl)furan:2-furanmethanethiol:4-hydroxy-2,5-dimethyl-3(2H)furanone is x:y:z where x ranges from about 13 to about 17, y ranges from about 22 to about 26, and z ranges from about 400 to about 600. In some embodiments, the 4-hydroxy-2,5-dimethyl-3(2H)furanone ranges from 40 ppb to 120 ppm, the 2-furanmethanethiol ranges from 1 ppb to 1200 ppb and the 2-(1-mercaptoethyl)furan ranges from 1 ppb to 1200 ppb. The aroma composition may sometimes further comprise a compound selected from the group consisting of hexenol, 1,5-octadien-3-one, 3-(methylthio)propionaldehyde, 2,3-diethyl-5-methyl pyrazine, (E)-2-nonenal, (E,Z)-2,6-nonadienal, butanoic acid, 2 or 3-methylbutanoic acid, 2-methyl-3-(methyldithio)furan, dimethyltrisulfide, dimethyltetrasulfide, 4-hydroxy-2-ethyl-5-methyl-3-(2H)furanone, m-cresol, 3-hydroxy-4,5-dimethyl-2-(5H)furanone, and any combination thereof. Preferably, the aroma composition further comprises at least one organic amine. In some embodiments, the wherein the ratio of 2-(1-mercaptoethyl)furan:2-furanmethanethiol:4-hydroxy-2,5-dimethyl-3(2H)furanone: organic amine is x:y:z:a where x ranges from about 13 to about 17, y ranges from about 22 to about 26, z ranges from about 400 to about 600, and a ranges from about 50 to about 400. Preferably, the product is a food product. In some embodiments, the food product is a pet food product. In some embodiments, the food product has a protein content of at least about 15% by weight, a carbohydrate content range of about 30 wt % to about 70 wt %, a fat content of greater than about 3.0 wt %, a crude fiber content range of about 0 wt % to about 10 wt %.

In another aspect of the present invention, there is an aroma-modified product comprising a base and a aroma composition where said aroma composition comprises a first component selected from the group consisting of 4-hydroxy-2,5-dimethyl-3(2H)furanone, 3-hydroxy-2-methyl-4H-pyran-4-one, 2-ethyl-4-hydroxy-5-methyl-3(2H)furanone, 4-hydroxy-5-methyl-3(2H)furanone, a sulfur-containing analogue of any of the foregoing, and any combination, thereof; a second component selected from the group consisting of 2-furanmethanethiol, 2-methyl-3-furanthiol, 5-methyl-2-furanmethanthiol, and any combination, thereof; and, a third component selected from the group consisting of 2-(1-mercaptoethyl)furan, 2-furanethanethiol, bis-(2-furfuryl) disulfide, a furanthiol disulfide, and any combination, thereof. In some embodiments, the base is a food. In some embodiments, the food is a pet food.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

As used herein, the use of the word "a" or "an" when used in conjunction with the term "comprising" in the claims and/or the specification may mean "one," but it is also consistent with the meaning of "one or more," "at least one," and "one or more than one." Still further, the terms "having," "including," "containing" and "comprising" are interchangeable and one of skill in the art is cognizant that these terms are open ended terms.

As used herein, "animal" encompasses both non-human animals and humans.

As used herein, "aroma" shall include odor and/or taste. The terms "aroma" and "flavor" are synonymous and are used interchangeably. The aroma composition can be selected from a liquid, dry powder, spray, paste, suspension and any combination thereof. The aroma can be either a natural composition, an artificial composition or any combination thereof.

As used herein, "flavor" shall include odor and/or taste. The terms "flavor" and "aroma" are synonymous and are used interchangeably. The flavor composition can be selected from a liquid, dry powder, spray, paste, suspension and any combination thereof. The flavor can be either a natural composition, an artificial composition or any combination thereof.

As used herein, "ppb" means parts-per-billion and is a weight relative parameter. A part-per-billion is a nanogram per gram, such that a component that is present at 10 ppb is present at 10 nanograms of the specific component per 1 gram of the aggregate mixture.

As used herein, "ppm" means parts-per-million and is a weight relative parameter. A part-per-million is a microgram per gram, such that a component that is present at 10 ppm is present at 10 micrograms of the specific component per 1 gram of the aggregate mixture.

As used herein "admixing the product with a flavoring composition" refers to the process where the flavor is mixed with or added to the completed product or mixed with some or all of the components of the product during product formation or some combination of these steps. When used in the context of admixing the term "product" refers to the product or any of its components. This admixing step can include a process selected from the step of adding the flavor to the product, spraying the flavor on the product, coating the flavor on the product, suspending the product in the flavor, painting the flavor on the product, pasting the flavor on the product, encapsulating the product with the flavor, mixing the flavor with the product and any combination thereof. The flavor composition is selected from a liquid, dry powder, spray, paste, suspension and any combination thereof.

As used herein, "fats and oils" take as their meaning the customary in the art. The terms "fat" and "oil" are used interchangeably herein.

A nutritionally complete food is a nutritionally adequate food for animals, that can be fed as a sole ration and is capable of sustaining life without additional food (aside from water).

A balanced food is a nutritionally complete food which also has known nutrients in the proper amount and proportion.

In view of feeding trials which demonstrate that tuna products consistently feed well in cats, the inventors have developed aroma compositions, the use of which results in more palatable products and products with more tuna-like aromas. If the aroma of tuna products could be reproduced in a composition, the advantages observed in tuna products could be applied to other food products. The inventors have surprisingly discovered a combination of aroma compounds which together deliver a tuna aroma when tested by a human panel.

Table 1 provides the odor active compounds found in canned tuna, along with odorant characteristics as determined analytically:

TABLE 1

| Aroma Compounds | |
|---|---|
| Aroma Compound | Aroma Compound Quality |
| Trimethylamine | fishy, oily, sweaty |
| Hexenol | green |
| 1,5-octadien-3-one | metallic, geranium |
| 2-(1-mercaptoethyl)furan | tuna |
| 2-furanmethanethiol | coffee, tuna |
| methylthioproprionaldehyde | cooked potato |
| 2,3-diethyl-5-methylpyrazine | earthy |
| (E) 2-nonenal | cucumber |
| (E,Z) 2,6-nonadienal | cucumber |
| butanoic acid | cheesy |

TABLE 1-continued

Aroma Compounds

| Aroma Compound | Aroma Compound Quality |
|---|---|
| 2/3-methylbutanoic acid | sweaty |
| 2-methyl-3-3(methyldithio) furan | meaty |
| Dimethyltetrasulfide | cabbage |
| 4-hydroxy-2,5-dimethyl-3-(2H)- furanone | cotton candy |
| 4-hydroxy-2-ethyl-5-methyl-3(2H)-furanone | sweet, caramelic |
| m-cresol | barnyard |
| 3-hydroxy-4,5-dimethyl-2-(5H)-furanone | spicy, celery |

One skilled in the art recognizes that the flavor or aroma compositions used herein are preferably useful in products that contain no or little natural tuna. As used herein little natural tuna is usually a food product that contains less than 10%, preferably less than 5%, more preferably less than 2% and most preferably 0% natural tuna in the finished product. One skilled in the art, however, also recognizes that the aroma and flavor composition of the present invention can be added to products containing natural tuna flavor to enhance the flavor and this is within the contemplated scope of the present invention.

In the preferred embodiment, the aroma composition comprises a first component, a second component, and a third component wherein the first component comprises one or more of 4-hydroxy-2,5-dimethyl-3(2H)furanone, 2-ethyl-4-hydroxy-5-methyl-3(2H)furanone, 4-hydroxy-5-methyl-3(2H)furanone, one or more of a sulfur-containing analogue of any of the foregoing, and any combination thereof. The first component may also comprise one or more of other related compounds in this family of compounds. Most preferably, the first component comprises 4-hydroxy-2,5-dimethyl-3(2H) furanone. The second component preferably comprises one or more of 2-furanmethanethiol, 2-methyl-3-furanthiol, 5-methyl-2-furanmethanthiol, and any combination thereof. The second component may also comprise any one of the other related compounds in this family of compounds. Most preferably, the second component comprises 2-furanmethanethiol. The third component comprises one or more of 2-(1-mercaptoethyl) furan, 2-furanethanethiol, bis-(2-furfuryl)disulfide, a furanthiol disulfide, and any combination thereof. The third component may also comprise any one of the other related compounds in this family of compounds.

The third component is most preferably 2-(1-mercaptoethyl) furan. In some embodiments, the aroma composition further comprises a fourth component; an organic amine. When present, the organic amine is preferably trimethylamine. Preferably, the weight ratios of first component to the second component to the third component is x:y:z where x ranges from about 1 to about 25, y ranges from about 1 to about 50, and z ranges from about 100 to about 1000. Where the fourth component is present, it is designated as component "a" and the weight ratio becomes x:y:z:a where x, y, and z have their values as given above and "a" is preferably in the weight ratio range of up to about 750. More preferably, the weight ratio of first component to the second component to the third component is x:y:z where x ranges from about 5 to about 20, y ranges from about 15 to about 35, and z ranges from about 250 to about 750 (where the fourth component "a" is present, its weight ratio relative to the other components is in the range of up to about 600).

Even more preferably, the weight ratio of first component to the second component to the third component is x:y:z where x ranges from about 13 to about 17, y ranges from about 22 to about 26, and z ranges from about 400 to about 600 and the fourth component "a" is present and its weight ratio relative to the other components is in the range of about 50 to about 400. Most preferably, the weight ratio of first component to the second component to the third component is x:y:z and is about 15:24:450 (preferably, component "a" is also present and x:y:z:a is about 15:24:450:221. These are summarized below in Table 2. The preferred values in concentration units (in oil:water mixture and in white salmon base) are also provided in Table 2.

TABLE 2

Example Variability of Various Components

| | Range | 4-hydroxy-2,5-dimethyl-3(2H)furanone (4HDF) Component z | Trimethylamine (TMA) Component a | 2-furanmethanethiol (FM) Component y | 2-(1-mercaptoethyl)-furan (MEF) Component x |
|---|---|---|---|---|---|
| x:y:z | Preferred | 100-1000 | 0-750 | 1-50 | 1-25 |
| | More Preferred | 250-750 | 0-600 | 15-35 | 5-20 |
| | More Preferred | 400 to about 600 | 50-400 | 22 to about 26 | 13 to about 17 |
| | Most Preferred | 450 | 221 | 24 | 15 |
| Aroma in Base | Preferred | about 40 ppb- about 120,000 ppb | about 5 ppb- about 5000 ppb | About 1 ppb to about 1200 ppb | about 1 ppb to about 900 ppb |
| | More Preferred | 200-60,000 | 20-1500 | 1-750 | 1-600 |
| | More Preferred | 400 ppb-600 ppb | 50-500 | 1-400 | 1-300 |
| | Most Preferred | 450 ppb | 221 ppb | 24 ppb | 15 ppb |
| Aroma in Carrier | Preferred | about 500 ppb- about 9000 ppb | about 500 ppb- about 4500 ppb | about 50 ppb- about 450 ppb | about 15 ppb- about 240 ppb |
| | More Preferred | 750 ppb-6000 ppb | 650 ppb-3500 ppb | 50 ppb-300 ppb | 15 ppb-150 ppb |
| | More Preferred | 1000 ppb-3000 ppb | 800 ppb-2000 ppb | 60 ppb-150 ppb | 30 ppb-75 ppb |
| | Most Preferred | 1500 ppb | 1000 ppb | 75 ppb | 40 ppb |

In some embodiments, the flavoring composition further comprises another component selected from the group consisting of hexenol, 1,5-octadien-3-one, 3-(methylthio)propionaldehyde, 2,3-diethyl-5-methyl pyrazine, (E)-2-nonenal, (E,Z)-2,6-nonadienal, butanoic acid, 2 or 3-methylbutanoic acid, 2-methyl-3-(methyldithio)furan, dimethyltrisulfide, dimethyltetrasulfide, 4-hydroxy-2-ethyl-5-methyl-3-(2H) furanone, m-cresol, 3-hydroxy-4,5-dimethyl-2-(5H)furanone, and any combination thereof.

The aroma composition can be applied to a wide variety of products or bases. Products or bases can be foods or non-foods for both human and non-human animals. They are preferably pet foods. They may also be pet accessories or pet health products. Preferably, where the base is a pet food, it is a wet or semi-moist pet food. Alternatively, it may be a dry pet food. In dry pet food embodiments, the moisture content preferably ranges from about 6% to about 12%. In wet pet food embodiments, the moisture content preferably ranges from about 65% to about 85%. Other embodiments include those directed to intermediate moisture pet food products, which preferably range in moisture from about 20% to about 30%.

Experiments were performed in which concentrations of three components were essentially fixed and the concentration of one component was varied in water and oil carrier. Table 3 shows a summary of the results of these experiments and provides the ranges for the aroma compounds. The tables show that varying the ratios of the various compounds will deliver a fishy and cooked fish smell, but as the ratios approach the most preferred ratios, the aroma becomes more tuna-like as the various components are at the appropriate balance. If the first component (4-hydroxy-2,5-dimethyl-3 (2H)furanone family) is too low, the aroma will be out of balance with the aroma being stronger in sulfur and roasty burnt notes. If this component is too high, the odorant will begin to cover the roast, oily and fish notes and generally smell a little too sweet. If the second component (i.e., the 2-furanmethanethiol family) or third component (i.e., the 2-(1-mercapotethyl)furan family) is too low, the roast note will be too low and the aroma won't smell as cooked. If this component is too high, the roast note can start to over power the fishy and oily notes and the aroma can smell too burnt. If the organic amine component is too low, the aroma will smell cooked but will smell less fish-like. If this component is too high the aroma can smell rotten or spoiled.

TABLE 3

Concentration Range Experiments for Aroma Compounds

| 4HDF (ppb) | TMA (ppb) | FM (ppb) | MEF (ppb) | Sensory |
|---|---|---|---|---|
| 4-Hydroxy-2,5-dimethyl-3(2H)furanone(4HDF) Concentration Range Experiment in a Water/Oil Mixture (1:1) | | | | |
| 41 | 229 | 26 | 14 | Moderate cooked fish; low dark roast; slight tuna impression; slight sweet aromatics |
| 455 | 221 | 24 | 15 | low cooked fish; slight tuna impression; slight green; slight sweet aromatics |
| 979 | 244 | 26 | 15 | low cooked fish; slight tuna impression; slight green; slight sweet aromatics |
| 41,104 | 211 | 25 | 20 | moderate tuna impression; low cooked fish; low sweet aromatics |
| Trimethylamine (TMA) Concentration Range Experiment | | | | |
| 486 | 6 | 26 | 16 | moderate cooked fish; low tuna impression; slight sweet aromatics |
| 503 | 51 | 26 | 15 | moderate cooked fish; low tuna impression; slight sweet aromatics |
| 455 | 221 | 24 | 15 | low cooked fish; slight tuna impression; slight green; slight sweet aromatics |
| 480 | 1162 | 25 | 14 | moderate cooked fish; low tuna impression |
| 444 | 4644 | 26 | 15 | moderate cooked fish; moderate tuna |

TABLE 3-continued

Concentration Range Experiments for Aroma Compounds

| 4HDF (ppb) | TMA (ppb) | FM (ppb) | MEF (ppb) | Sensory |
|---|---|---|---|---|
| | | | | impression; slight dark roast; slight sweet aromatics |
| 2-Furanmethanethiol (FM) Concentration Range Experiment | | | | |
| 475 | 243 | 1 | 16 | moderate tuna impression; low cooked fish |
| 478 | 252 | 5 | 14 | moderate tuna impression; low cooked fish; slight dark roast |
| 455 | 221 | 24 | 15 | low tuna impression; low cooked fish; slight dark roast; slight green |
| 469 | 252 | 126 | 15 | moderate tuna impression; low cooked fish; low dark roast |
| 488 | 238 | 347 | 16 | moderate dark roast/coffee; slight cooked fish |
| 2-(1-mercaptoethyl)furan (MEF) Concentration Range Experiment | | | | |
| 493 | 260 | 27 | 1 | moderate cooked fish; slight tuna impression |
| 455 | 235 | 24 | 4 | moderate cooked fish; slight hvp/brothy; slight tuna impression |
| 455 | 221 | 24 | 15 | moderate cooked fish; slight hvp/brothy; slight tuna impression; slight green |
| 505 | 267 | 27 | 79 | low cooked fish; low sulfur; low meat impression |
| 498 | 263 | 28 | 300 | slight cooked fish; moderate phenolic |

In some embodiments, the aroma composition comprises a carrier and the 4-hydroxy-2,5-dimethyl-3(2H)furanone ranges from 40 ppb to 120 ppm, the 2-furanmethanethiol ranges from 1 ppb to 1200 ppb and the 2-(1-mercaptoethyl) furan ranges from 1 ppb to 900 ppb. Preferably, the carrier is a water:oil carrier, however, other carriers may be used. The oil in the water:oil carrier may be any fat or oil. Non-limiting examples of other carriers include glycerol (glycerin), alcohol, other fats and oils, other food grade carriers known to those of ordinary skill in the art, fatty acid mono- and di-glycerides, and medium chain triglycerides. Preferably, an aqueous emulsion is used. Preferably, the composition comprises at least one organic amine, preferably as an alkylamine, but other organic amines may be used, such as an aromatic amine. Preferably, the organic amine comprises trimethylamine. Combinations of organic amines may be used. Preferably when used, the organic amine level ranges from about 5 ppb to about 5000 ppb. In a preferred embodiment, the composition comprises a mixture of oil and water at equal ratios. In other embodiments, the aroma composition further comprises a compound selected from the group consisting of hexenol, 1,5-octadien-3-one, methional, 2,3-diethyl-5-methylpyrazine, (E)-2-nonenal, (E,Z)-2,6-nonadienal, butanoic acid, 2 or 3-methyl butanoic acid, 2-methyl-3-(methyldithio) furan, dimethyltetrasulfide, dimethyltrisulfide, 4-hydroxy-2-ethyl-5-methyl-3-(2H)furanone, m-cresol, 3-hydroxy-4,5-dimethyl-2-(5H)furanone, and any combination thereof. In some embodiments, the aroma composition has a tuna flavor.

It is particularly beneficial when the carrier comprises both oil and water since the aroma composition comprises both oil and water soluble compounds. The level of oil and water in the carrier can be varied from containing very little water (1% or greater) and mostly oil (99% or less) to containing practically no oil (0% or greater) and almost all water. The aroma composition may take any form, including but not limited to liquid, dry powder, spray, paste, suspension, and any combination thereof. In some embodiments, the aroma composition comprises natural components, artificial components, or a combination of natural components and artificial components.

It was determined that the optimum concentrations of odor components, in an appropriate solution, was one having 455 ppb 4-hydroxy-2,5-dimethyl-3(2H)furanone, 221 ppb trimethylamine, 24 ppb 2-furanmethanethiol, and 15 ppb MEF (2-(1-mercaptoethyl)furan). Preferably, the ratio of 2-(1-mercaptoethyl)furan:2-furanmethanethiol:4-hydroxy-2,5-dimethyl-3(2H)furanone is x:y:z where x ranges from about 13 to about 17, y ranges from about 22 to about 26, and z ranges from about 400 to about 600. More preferably, the ratio of 2-(1-mercaptoethyl)furan:2-furanmethanethiol:4-hydroxy-2,5-dimethyl-3(2H)furanone is x:y:z where x is about 15, y is about 24, and z is about 450. If present, the ratio of the organic amine can be designated as "a" such the ratio above becomes x:y:z:a. In this case, x ranges from about 13 to about 17, y ranges from about 22 to about 26, z ranges from about 400 to about 600, and "a" ranges from about 50 to about 400. For a mixture of oil and water in equal ratios, a preferred aroma composition contains 40 ppb to 120 ppm 4-hydroxy-2,5-dimethyl-3(2H)furanone, the 2-furanmethanethiol ranges from 1 ppb to 1200 ppb and the 2-(1-mercaptoethyl)furan ranges from 1 ppb to 900 ppb. The oil used was a vegetable oil.

The composition can be used in a method of flavoring a product comprising the step of admixing a base with an aroma composition to form said product wherein said aroma composition comprises: a first component, a second component and a third component. As used herein, the term "base" means a product or material to which the aroma composition is to be added. The "base" is the product or material to which the aroma composition is added to create a final aroma-modified product. The base is preferably a food, but may be a non-food. The food product may be a human food or a pet food. The food product is preferably a pet food product, most preferably a wet or semi-moist pet food product, however, it may be a dry pet food product. The base may be just a small portion of or the majority of the product. When the base is a food it preferably comprises a carbohydrate, a fat, a protein or a combination of those components. These food materials may include cooked or un-cooked dough, cereal grains, a blend of animal and or vegetable proteins. In one preferred embodiment, the base is a blend of meats. Other non-limiting examples include fish proteins, such as surimi or white salmon, dairy, soy, chicken, mycoproteins derived from fungus or any other deodorized proteins. The admixing step may, for example, be selected from the step of adding the aroma to the product, spraying the aroma on the product, coating the aroma on the product, suspending the product in the aroma, painting the aroma on the product, pasting the aroma on the product, encapsulating the product with the aroma, mixing the aroma with the product and any combination thereof. When the aroma composition (including the carrier) is sprayed or coated onto the food, it is preferably done so at a level of about 0.001% to about 10%, more preferably from about 0.01% to about 1%, and most preferably from about 0.1% to about 0.5%. Preferably, the first component comprises 4-hydroxy-2,5-dimethyl-3(2H)furanone, said second component comprises 2-furanmethanethiol, and said third component comprises 2-(1-mercaptoethyl)furan. The aroma composition preferably has a ratio of 2-(1-mercaptoethyl)furan:2-furanmethanethiol:4-hydroxy-2,5-dimethyl-3(2H)furanone of x:y:z where x ranges from about 13 to about 17, y ranges from about 22 to about 26, and z ranges from about 400 to about 600. More broadly, the aroma composition preferably has a ratio of 2-(1-mercaptoethyl)furan:2-furanmethanethiol:4-hydroxy-2,5-dimethyl-3(2H)furanone of x:y:z where x ranges from about 1 to 25, y ranges from about 1 to 50, and z ranges from 100 to 1000. If present, the ratio of the organic amine can be designated as "a" such the ratio above becomes x:y:z:a. Preferably in this case, x ranges from about 13 to about 17, y ranges from about 22 to about 26, z ranges from about 400 to about 600, and a ranges from about 50 to about 400. More broadly, the preferably ranges are as follows: x ranges from about 1 to 25, y ranges from about 1 to 50 z ranges from about 100 to 1000, and a ranges from just above 0 to 750. In most preferred embodiments, the ratio of 2-(1-mercaptoethyl)furan:2-furanmethanethiol:4-hydroxy-2,5-dimethyl-3(2H)furanone is x:y:z where x is about 15, y is about 24, and z is about 450. In some embodiments, in the base, the 4-hydroxy-2,5-dimethyl-3(2H)furanone ranges from 40 ppb to 120 ppm, the 2-furanmethanethiol ranges from 1 ppb to 1200 ppb and the 2-(1-mercaptoethyl)furan ranges from 1 ppb to 1200 ppb. In some embodiments, the flavoring composition further comprises a compound selected from the group consisting of hexenol, 1,5-octadien-3-one, 3-(methylthio)propionaldehyde, 2,3-diethyl-5-methyl pyrazine, (E)-2-nonenal, (E,Z)-2,6-nonadienal, butanoic acid, 2 or 3-methylbutanoic acid, 2-methyl-3-(methyldithio)furan, dimethyltrisulfide, dimethyltetrasulfide, 4-hydroxy-2-ethyl-5-methyl-3-(2H)furanone, m-cresol, 3-hydroxy-4,5-dimethyl-2-(5H)furanone, and any combination thereof. Initial levels can be adjusted to account for loss of odorants during processing. Some examples of non-food bases include toys, and a pet accessories.

In another aspect of the present invention, there is an aroma-modified product which comprises a base and an aroma composition. The aroma composition comprises a first component, a second component, and a third component. The first component is selected from the group consisting of 4-hydroxy-2,5-dimethyl-3(2H)furanone, 3-hydroxy-2-methyl-4H-pyran-4-one, 2-ethyl-4-hydroxy-5-methyl-3(2H)furanone, 4-hydroxy-5-methyl-3(2H)furanone, a sulfur-containing analogue of any of the foregoing, and any combination, thereof; the second component is selected from the group consisting of 2-furanmethanethiol, 2-methyl-3-furanthiol, 5-methyl-2-furanmethanthiol, and any combination, thereof; and the third component is selected from the group consisting of 2-(1-mercaptoethyl)furan, 2-furanethanethiol, bis-(2-furfuryl) disulfide, a furanthiol disulfide, and any combination, thereof. In preferred embodiments, the first component comprises 4-hydroxy-2,5-dimethyl-3(2H)furanone, the second component comprises 2-furanmethanethiol, and the third comprises 2-(1-mercaptoethyl)furan. Preferably, the ratio of 2-(1-mercaptoethyl)furan:2-furanmethanethiol:4-hydroxy-2,5-dimethyl-3(2H)furanone is x:y:z where x ranges from about 13 to about 17, y ranges from about 22 to about 26, and z ranges from about 400 to about 600. More broadly, the aroma composition preferably has a ratio of 2-(1-mercaptoethyl)furan:2-furanmethanethiol:4-hydroxy-2,5-dimethyl-3(2H)furanone of x:y:z where x ranges from about 1 to 25, y ranges from about 1 to 50, and z ranges from 100 to 1000. Most preferably, the ratio of 2-(1-mercaptoethyl)furan:2-furanmethanethiol:4-hydroxy-2,5-dimethyl- 3(2H)furanone is x:y:z where x is about 15, y is about 24, and z is about 450. If present, the ratio of the organic amine can be designated as "a" such the ratio above becomes x:y:z:a. In this case, x ranges from about 13 to about 17, y ranges from about 22 to about 26, z ranges from about 400 to about 600, and a ranges from about 50 to about 400. More broadly, the preferably ranges are as follows: x ranges from about 1 to 25, y ranges from about 1 to 50 z ranges from about 100 to 1000, and a ranges from just above 0 to 750. In embodiments wherein organic amine is present, it preferably ranges from about 4 ppb to about 15,000 ppb. Preferably, the organic amine comprises trimethylamine.

When the base is a food, it may be dry, semi-moist or wet. In some preferred embodiments, the base is white salmon, chicken or deodorized proteins. In embodiments where the base is meat, the preferred concentration of first component (x) is from about 15 ppb to about 240 ppb, more preferably about 15 ppb to about 150 ppb, even more preferably about 30 ppb to about 75 ppb, and most preferably is about 40 ppb. Also where the base is meat, the preferred concentration of second component (y) is from about 50 ppb to about 450 ppb, more preferably about 50 ppb to about 300 ppb, even more preferably about 60 ppb to about 150 ppb, and most preferably is about 75 ppb. Also where the base is meat, the preferred concentration of third component (z) is from about 500 ppb to about 9000 ppb, more preferably about 750 ppb to about 6000 ppb, even more preferably about 1000 ppb to about 3000 ppb, and most preferably is about 1500 ppb. Where the fourth component "a" (organic amine) is present, it is present from about 500 ppb to about 4500 ppb, more preferably about 650 ppb to about 3500 ppb, even more preferably about 800 ppb to about 2000 ppb, and most preferably is about 1000 ppb. In some preferred embodiments, the base is a bland base wherein a human sensory panel detects little or no aroma prior to the addition of the aroma composition. Optionally, another component may be added, the component being selected from the group consisting of hexenol, 1,5-octadien-3-one, 3-(methylthio)propionaldehyde, 2,3-diethyl-5-methylpyrazine, (E)-2-nonenal, (E,Z)-2,6-nonadienal, butanoic acid, 2 or 3-methylbutanoic acid, 2-methyl-3-(methyldithio)furan, dimethyltrisulfide, dimethyltetrasulfide, 4-hydroxy-2-ethyl-5-methyl-3-(2H)furanone, m-cresol, 3-hydroxy-4,5-dimethyl-2-(5H)furanone, and any combination thereof.

For a composition with a white salmon base the preferable aroma composition contains 1500 ppb 4-hydroxy-2,5-dimethyl-3(2H)furanone, 75 ppb of 2-furanmethanethiol, and 40 ppb of 2-(1-mercaptoethyl)furan. In addition, 1000 ppb of trimethylamine can be added to the white salmon base. One skilled in the art recognizes that the above ranges includes any of the smaller ranges within the range specified and also includes the individual concentrations within the range given. The odorants can be put into other carriers commonly used in the flavor industry, as long as the odor compounds are soluble or miscible. For illustrative purposes herein, oil and water was selected since not all of the odor compounds are water-soluble. In some embodiments, the flavoring composition further comprises a compound selected from the group consisting of hexenol, 1,5-octadien-3-one, 3-(methylthio)propionaldehyde, 2,3-diethyl-5-methyl pyrazine, (E)-2-nonenal, (E,Z)-2,6-nonadienal, butanoic acid, 2 or 3-methyl butanoic acid, 2-methyl-3-(methyldithio)furan, dimethyltrisulfide, dimethyltetrasulfide, 4-hydroxy-2-ethyl-5-methyl-3-(2H)furanone, m-cresol, 3-hydroxy-4,5-dimethyl-2-(5H)furanone, and any combination thereof.

In some embodiments, the food is pet food. Preferably, the pet food is selected from the group consisting of cat food and dog food. Typically, the pet food has a protein content of about 15% by weight or greater, a carbohydrate content range of about 30 wt % to about 70 wt %, a fat content of greater than about 3.0 wt %, a crude fiber content range of about 0 wt % to about 10 wt %. In dry pet food embodiments, the moisture content preferably ranges from about 6% to about 12%. In wet pet food embodiments, the moisture content preferably ranges from about 65% to about 85%. Other embodiments include those directed to intermediate moisture pet food products, which preferably range in moisture from about 20% to about 30%.

The additional of an organic amine has been found to enhance the aroma composition. Preferably, the flavoring composition further comprises at least one organic amine. Most preferably, the organic amine is an alkylamine and comprises trimethylamine. As seen from the results presented above, the optimum concentration of trimethylamine for a 1:1 water:oil mixture of the composition is about 221 ppb. However the trimethylamine (or other alkylamine or benzylamine) can be present at a level ranging from about 6 ppb to about 4.6 ppm.

It has been found that the aroma composition may comprise a number of other aroma-enhancing components. These include hexenol, 1,5-octadien-3-one, methylthioproprionaldehyde, 2,3-diethyl-5-methylpyrazine, (E)-2-nonenal, (E,Z)-2,6-nonadienal, butanoic acid, 2 or 3-methyl butanoic acid, 2-methyl-3-(methyldithio)furan, dimethyltetrasulfide, dimethyltrisulfide, 4-hydroxy-2-ethyl-5-methyl-3-(2H)furanone, m-cresol, 3-hydroxy-4,5-dimethyl-2-(5H)furanone, and any combination thereof. It should be understood that the compositions of the present invention may comprise other components other than those specifically described herein. The components may include natural components, artificial components or a combination of artificial and natural components.

While theoretically the preferred weight ratios of the individual components of the aroma composition should be the same regardless of the matrix, in reality one skilled in the art is aware that the optimum concentrations of the individual components will vary depending on the food or food composition matrix to which the aroma composition is added. Table 4 compares the 1:1 water:oil model described above with two other food matrices. From the data provided, it can be seen that the aroma composition user may vary the concentrations in order to provide the desired results.

TABLE 4

Model System Aroma Compound Concentrations

| Model | 4HDF (ppb) | TMA (ppb) | FM (ppb) | MEF (ppb) | Sensory Descriptor |
|---|---|---|---|---|---|
| (Water/Oil) (50/50) | 455 | 221 | 24 | 15 | low cooked fish; slight tuna impression; slight green; slight sweet aromatics |
| (Protein/ Carbohydrate/ Fat/Water) (22/2/0.5/75) | 4,500 | 2200 | 230 | 140 | large tuna impression; moderate cooked fish; low dark roast, slight sweet aromatics |
| (Protein/ Carbohydrate/ Fat/Water) (20/0/8/72) | 3,000 | 1,460 | 148 | 78 | moderate cooked fish; low salmon impression, low tuna |

Thus, it can be seen that compound concentrations may be varied depending upon the nature of the matrix to optimize the resulting aroma. One of ordinary skill in the art, knowing the desired aroma to be applied would then modify the concentrations to arrive at the desired aroma. Relative ratios may also be varied if desired, although it has been found that the above ratios represent the preferred ratio. It should be noted that in some cases, the matrix may comprise real tuna. In such cases, the food product would comprise real tuna with added tuna aroma composition.

Likewise, from similar experiments it was found that when the composition comprises a white salmon base, the 4-hydroxy-2,5-dimethyl-3(2H)furanone is preferably about 1500 ppm, the 2-furanmethanethiol is preferably about 75 ppb, the 2-(1-mercaptoethyl)furan is preferably about 1200 ppb and the trimethylamine is preferably about 4 to 40 ppb.

The same rationale applies to aroma addition/modification of non-food articles. The compound concentrations and perhaps the relative ratio of the components may require modification to achieve the desired result. Non-food articles include, but are not limited to drugs, not only prescription drugs but over the counter drugs, vitamins, supplements and/ or other similar products as are well known to one skilled in the art, pet health accessories, and toys.

It is within the skilled artisans knowledge and skill to determine the optimum level of an aroma or flavor compound or composition to use with a specific matrix. Although testing is needed to determine the optimum, this is routine experimentation in the field. Sample methods to perform this testing are provided herein.

The composition described herein may be used in a method of manufacturing a flavored product. The method comprises admixing to said product an aroma composition, wherein the aroma composition comprises, a first component selected from the group consisting of 4-hydroxy-2,5-dimethyl-3(2H) furanone, 3-hydroxy-2-methyl-4H-pyran-4-one, 2-ethyl-4-hydroxy-5-methyl-3(2H)furanone, 4-hydroxy-5-methyl-3 (2H)furanone, a sulfur-containing analogue of any of the foregoing, and any combination, thereof; a second component selected from the group consisting of 2-furanmethanethiol, 2-methyl-3-furanthiol, 5-methyl-2-furanmethanthiol, and any combination, thereof; and, a third component selected from the group consisting of 2-(1-mercaptoethyl)furan, 2-furanethanethiol, bis-(2-furfuryl) disulfide, a furanthiol disulfide, and any combination, thereof.

Preferably the food compositions are those of a bland, aroma free base, being complete and nutritionally balanced. A non-limiting, illustrative example of a bland base is one preferably having a protein content greater than 15 wt %, a preferred range of 15 to 65 wt %, a more preferred range of 15 to 35 wt %, and a most preferred range of 18 to 25 wt %. The carbohydrate content is preferably in the range of 30 to 70 wt %, preferably 35 to 50 wt % and most preferable 40 to 45 wt %. The fat content is preferably greater than 3 wt %, in a preferred range of 3 to 20.0 wt %, a more preferred range of 3 to 10.0 wt % and a most preferred range of 3.0 to 8.0 wt %. The crude fiber content is preferably in the range of 0 to 10 wt %, a preferred range of 0.5 to 9 wt %, a more preferred range of 1.0 to 8 wt %, and a most preferred range of 2.0 to 8.0 wt %. The food preferably has a percent moisture of 6 to 32%, a preferred range of 12 to 28%, a more preferred range of 14 to 24%, and a most preferred range of 14 to 22%. The water activity (Aw) is less than 0.9, in preferred range of 0.5 to 0.90, a more preferred range of 0.6 to 0.85, and a most preferred range of 0.65 to 0.80. This ranges are particularly preferred when the food is a pet food.

A base is bland when after a trained sensory panel completes a quantitative descriptive analysis, no aroma attribute is above moderate and preferably all are below weak. Sensory tests are common and known to those of skill in the art in the foods, flavors and fragrances fields. A description of exemplary tests can be found, for example, in "Sensory Analysis of Foods", Ed. J. R. Piggott, Elsevier Applied Science Publishers London and New York, 1984, ISBN 0-85334-272-5; and "Principles of Sensory Evaluation of Food" M. A. Amerine, Academic Press: New York, 1965; and "Sensory Evaluation Techniques, Third Edition, M. Meilgaard; G. V. Civille; B. T. Carr, CRC Press: Boca Raton, Fla., 1999.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An aroma composition comprising:
    a first component selected from the group consisting of 4-hydroxy-2,5-dimethyl-3(2H)furanone, 3-hydroxy-2-methyl-4H-pyran-4-one, 2-ethyl-4-hydroxy-5-methyl-3(2H)furanone, 4-hydroxy-5-methyl-3(2H)furanone, and any combination thereof;
    a second component selected from the group consisting of 2-furanmethanethiol, 2-methyl-3-furanthiol, 5-methyl-2-furanmethanthiol, and any combination thereof; and,
    a third component selected from the group consisting of 2-(1-mercaptoethyl)furan, 2-furanethanethiol, bis-(2-furfuryl)disulfide, a furanthiol disulfide, and any combination, thereof
    wherein the ratio of said first component to said second component to said third component is x:y:z where x ranges from about 13 to about 17, y ranges from about 22 to about 26, and z ranges from about 400 to about 600.

2. The aroma composition of claim 1, wherein said first component comprises 4-hydroxy-2,5-dimethyl-3(2H)furanone, said second component comprises 2-furanmethanethiol, and said third component comprises 2-(1-mercaptoethyl)furan.

3. The aroma composition of claim 2, wherein the ratio of 2-(1-mercaptoethyl)furan:2-furanmethanethiol:4-hydroxy-2,5-dimethyl-3(2H)furanone is x:y:z where x is about 15, y is about 24, and z is about 450.

4. The aroma composition of claim 2, wherein the composition further comprises a 1:1 water:oil carrier mixture and the 4-hydroxy-2,5-dimethyl-3(2H)furanone ranges from 40 ppb to 120 ppm, the 2-furanmethanethiol ranges from 1 ppb to 1200 ppb and the 2-(1-mercaptoethyl)furan ranges from 1 ppb to 900 ppb.

5. The aroma composition of claim 1, further comprising at least one organic amine.

6. The aroma composition of claim 5, wherein the composition further comprises a 1:1 water:oil carrier mixture, wherein the organic amine is trimethylamine, and wherein the trimethylamine ranges from about 5 ppb to about 5000 ppb.

7. The aroma composition of claim 5, wherein the ratio of 2-(1-mercaptoethyl)furan:2-furanmethanethiol:4-hydroxy-2,5-dimethyl-3(2H)furanone:organic amine is x:y:z:a where x ranges from about 13 to about 17, y ranges from about 22 to about 26, z ranges from about 400 to about 600, and a ranges from about 50 to about 400.

8. The aroma composition of claim 1, further comprising a compound selected from the group consisting of hexenol, 1,5-octadien-3-one, 3-(methylthio)propionaldehyde, 2,3-diethyl-5-methylpyrazine, (E)-2-nonenal, (E,Z)-2,6-nonadienal, butanoic acid, 2 or 3-methyl butanoic acid, 2-methyl-3-(methyldithio)furan, dimethyltetrasulfide, dimethyltrisulfide, 4-hydroxy-2-ethyl-5-methyl-3-(2H)furanone, m-cresol, 3-hydroxy-4,5-dimethyl-2-(5H)furanone, and any combination thereof.

9. The aroma composition of claim 1, wherein said aroma composition has a tuna flavor.

10. An aroma-modified product comprising:
a base and a aroma composition where said aroma composition comprises:
a first component selected from the group consisting of 4-hydroxy-2,5-dimethyl-3(2H)furanone, 3-hydroxy-2-methyl-4H-pyran-4-one, 2-ethyl-4-hydroxy-5-methyl-3(2H)furanone, 4-hydroxy-5-methyl-3(2H)furanone, foregoing, and any combination, thereof;
a second component selected from the group consisting of 2-furanmethanethiol, 2-methyl-3-furanthiol, 5-methyl-2-furanmethanthiol, and any combination, thereof; and,
a third component selected from the group consisting of 2-(1-mercaptoethyl)furan, 2-furanethanethiol, bis-(2-furfuryl)disulfide, a furanthiol disulfide, and any combination, thereof
wherein the ratio of said first component to said second component to said third component is x:y:z where x ranges from about 13 to about 17, y ranges from about 22 to about 26, and z ranges from about 400 to about 600.

11. The aroma-modified product of claim 10, wherein said base is a food.

12. The aroma-modified product of claim 11, wherein said food is a pet food.

13. A method of flavor a product comprising the step of:
admixing said product with an aroma composition wherein said aroma composition comprises:
a first component selected from the group consisting of 4-hydroxy-2,5-dimethyl-3(2H)furanone, 3-hydroxy-2-methyl-4H-pyran-4-one, 2-ethyl-4-hydroxy-5-methyl-3(2H)furanone, 4-hydroxy-5-methyl-3(2H)furanone, and any combination, thereof;
a second component selected from the group consisting of 2-furanmethanethiol, 2-methyl-3-furanthiol, 5-methyl-2-furanmethanthiol, and any combination, thereof; and,
a third component selected from the group consisting of 2-(1-mercaptoethyl)furan, 2-furanethanethiol, bis-(2-furfuryl)disulfide, a furanthiol disulfide, and any combination, thereof;
a third component selection from the group consisting of 2-(1-mercaptoethyl)furan, 2-furanethanethiol, bis(2-furfuryl)disulfide, a furanthiol disulfide, and any combination thereof;
wherein the ratio of said first component to said second component to said third component is x:y:z where x ranges from about 13 to about 17, y ranges from about 22 to about 26, and z ranges from about 400 to about 600.

14. The method of claim 13, wherein said first component comprises 4-hydroxy-2,5-dimethyl-3(2H)furanone, said second component comprises 2-furanmethanethiol, and said third component comprises 2-(1-mercaptoethyl)furan.

15. The method of claim 14, wherein the 4-hydroxy-2,5-dimethyl-3(2H)furanone ranges from 40 ppb to 120 ppm, the 2-furanmethanethiol ranges from 1 ppb to 1200 ppb and the 2-(1-mercaptoethyl)furan ranges from 1 ppb to 1200 ppb.

16. The method of claim 13, wherein said aroma composition further comprises a compound selected from the group consisting of hexenol, 1,5-octadien-3-one, 3-(methylthio)propionaldehyde, 2,3-diethyl-5-methylpyrazine, (E)-2-nonenal, (E,Z)-2,6-nonadienal, butanoic acid, 2 or 3-methylbutanoic acid, 2-methyl-3-(methyldithio)furan, dimethyltrisulfide, dimethyltetrasulfide, 4-hydroxy-2-ethyl-5-methyl-3-(2H)furanone, m-cresol, 3-hydroxy-4,5-dimethyl-2-(5H)furanone, and any combination thereof.

17. The method of claim 13, further comprising at least one organic amine.

18. The method of claim 17, wherein the ratio of 2-(1-mercaptoethyl)furan:2-furanmethanethiol:4-hydroxy-2,5-dimethyl-3(2H)furanone:organic amine is x:y:z:a where x ranges from about 13 to about 17, y ranges from about 22 to about 26, z ranges from about 400 to about 600, and a ranges from about 50 to about 400.

19. The method of claim 13, wherein said product is a food product.

20. The method of claim 19, wherein said food product is a pet food product.

21. The method of claim 19, wherein said food product has a protein content of at least about 15% by weight, a carbohydrate content range of about 30 wt % to about 70 wt %, a fat content of greater than about 3.0 wt %, a crude fiber content range of about 0 wt % to about 10 wt %.

* * * * *

UNITED STATES PATENT AND TRADEMARK OFFICE
CERTIFICATE OF CORRECTION

PATENT NO.        : 7,867,540 B2   Page 1 of 1
APPLICATION NO.   : 11/489399
DATED             : January 11, 2011
INVENTOR(S)       : John Didzbalis et al.

It is certified that error appears in the above-identified patent and that said Letters Patent is hereby corrected as shown below:

In claim 1, col. 14, line 43, delete "first" and insert --third-- therefor.
In claim 1, col. 14, line 44, delete "third" and insert --first-- therefor.

In claim 10, col. 15, line 26, delete "foregoing," and delete "," after "combination".
In claim 10, col. 15, line 33, delete "first" and insert --third-- therefor.
In claim 10, col. 15, line 34, delete "third" and insert --first-- therefor.

In claim 13, col. 15, line 1, delete "flavor" and insert --flavoring-- therefor.
In claim 13, col. 16, delete lines 8-11.
In claim 13, col. 16, line 12, delete "first" and insert --third-- therefor.
In claim 13, col. 16, line 13, delete "third" and insert --first-- therefor.

Signed and Sealed this
Twenty-fifth Day of September, 2012

David J. Kappos
*Director of the United States Patent and Trademark Office*